(12) United States Patent
Borden

(10) Patent No.: US 6,514,361 B1
(45) Date of Patent: Feb. 4, 2003

(54) PREPARATION OF EMULSIONS

(75) Inventor: Craig Borden, Adamsville, AL (US)

(73) Assignee: Nelson Brothers, Inc., Birmingham, AL (US)

( * ) Notice: Subject to any disclaimer, the term of this patent is extended or adjusted under 35 U.S.C. 154(b) by 0 days.

(21) Appl. No.: 09/495,900

(22) Filed: Feb. 2, 2000

(51) Int. Cl.⁷ .......................... D03D 23/00; C06B 31/28
(52) U.S. Cl. ....................................... 149/109.6; 149/46
(58) Field of Search ................. 149/2, 46, 60, 149/76, 109.6

(56) References Cited

U.S. PATENT DOCUMENTS

| 4,708,753 A | * | 11/1987 | Forsberg | 149/2 |
| 4,828,633 A | * | 5/1989 | Forsberg | 149/2 |
| 4,844,756 A | * | 7/1989 | Forsberg | 149/2 |
| 4,919,178 A | * | 4/1990 | Riga et al. | 149/2 |

* cited by examiner

Primary Examiner—Michael J. Carone
Assistant Examiner—Aileen J. Baker
(74) Attorney, Agent, or Firm—Burns, Doane, Swecker & Mathis, L.L.P.

(57) ABSTRACT

Provided is a method for preparing an explosive emulsion. The method comprises first preparing an oil phase containing a hydrocarbyl-substituted anhydride, and preparing an aqueous phase containing an hydroxy amine, and preferably an oxidizer salt. The two phases are then mixed sufficiently to create a water-in-oil emulsion, with the anhydride and amine reacting at the interface of the two phases.

8 Claims, No Drawings

PREPARATION OF EMULSIONS

BACKGROUND OF THE INVENTION

1. Field of the Invention

The present invention relates to a water-in-oil emulsion explosive and a method of preparing same. More particularly, the present invention relates to a PIBSA-based explosive emulsion and a more efficient and economical method of preparing same.

2. Description of the Related Art

Water-in-oil emulsion explosives are well-known in the art, See, for example, U.S. Pat. Nos. 4,356,044; 4,322,258; 4,141,767; 3,447,978 and 3,161,551. Emulsion explosives are found to have certain advantages over conventional aqueous slurry explosives, which have a continuous aqueous phase, as described in U.S. Pat. No. 4,141,767.

An inherent problem with emulsion explosives, however, is their relative instability, due to the act that they comprise a thermodynamically unstable dispersion of supercooled solution or melt droplets in an oil-continuous phase. If the emulsion remains stable these supercooled droplets are prevented from crystallizing or solidifying into a lower energy state. If the emulsion weakens or becomes unstable, however, then crystallization or solidification of the droplets results, and the explosive generally loses at least some of its sensitivity to detonation and becomes too viscous to handle for certain blasting applications. Moreover, it is common to add solid components to emulsion explosives, such as glass microspheres for density reduction and prills or particles of oxidizer salt such as porous prilled ammonium nitrate (AN) for increased energy. These solid components, however, tend to destabilize emulsions.

Emulsion explosives commonly are used as a repumpable explosive, i.e., an explosive that is formulated at a remote facility, loaded or pumped into a bulk container and then transported in the container to a blasting site where it then is "repumped" from the container into a borehole. Alternatively, the explosive may be delivered (repumped) into a centrally located storage tank fro which it will be further repumped into a vehicle for transportation to a blasting site and then again repumped into the borehole. Thus the emulsion explosive must remain stable event after being subjected to repeated handling or searing action, which normally also tends to destabilize an emulsion. Additionally, the emulsion's viscosity must remain low enough to allow for repumping at reasonable pressures and at the low ambient temperatures that may be experienced during colder months. Repeated handling or hearing action also tends to increase the emulsion's viscosity.

Since a density control agent is required in many instances to reduce the density of an explosive and thereby increase its sensitivity to a required level for detonation, and since hollow microspheres are a preferred form of density control, it is important that the emulsion remain stable and have a low viscosity even when containing solid density control agents.

Proposals have been made to improve the stability of water-in-oil emulsion explosives by employing particular surfactants which function to a high level of efficiency in the harsh environment of an oxidizer salt solution. A particularly effective and useful surfactant has been the reaction product of a hydrocarbyl-substituted succinic acid or anhydride and an amine, e.g., a PIBSA (polyisobutenyl succinic anhydride) based emulsifier.

For example, U.S. Pat. No. 4,708,753 discloses water-in-oil emulsions containing as the emulsifier a salt derived from a hydrocarbyl-substituted carboxylic acid or anhydride, or ester or amide derivative thereof, and an amine.

U.S. Pat. No. 4,615,751 discloses the use of an unspecified polybutenyl succinic anhydride derivative (with a tradename of EXPERSE 60) as a water-resisting agent in emulsions containing prills but not as an emulsifier. European Patent Application No. 0 155 800 discloses alkanolamine derivatives of polyisobutenyl succinic anhydride as emulsifiers. See also U.S. Pat. Nos. 4,822,433; 4,919,179 also describes a PIBSA-based surfactant for use in explosive emulsions.

U.S. Pat. No. 4,710,248 discloses water-in-oil emulsion explosives containing as an emulsifier underivatized polyisobutenyl succinic anhydride or polyisobutenyl succinic acid.

U.S. Pat. No. 4,357,184 discloses water-in-oil emulsions containing graft block or branched polymer emulsifiers. One type of block copolymer which is taught contains polyisobutenyl succinic anhydride as the hydrophobic block and polyethylene glycol or polyethylenimine as the hydrophillic block.

Conventional polyisobutenyl succinic anhydride emulsifier chemistry requires that the emulsifier be formed in a 2-step chemical reaction comprising the hydrolysis of polyisobutenyl succinic anhydride, followed by the amination of the hydrolyzed product. The reactions can be burdensome, and add to the cost of using polyisobutenyl succinic anhydride based emulsifiers.

It is therefore an object of the present invention to provide a method of preparing an explosive emulsion which uses a PIBSA-based emulsifier which is more economical, yet still provides the advantages.

These and other objects of the present invention will become apparent to the skilled artisan upon a review of the following description and the claims appended hereto.

SUMMARY OF THE INVENTION

The "in-situ" process of the present invention does away with the conventional amination reaction needed to form a PIBSA-based emulsifier, and forms the emulsifier species during the emulsification process. Reaction times for preparing a water-in-oil emulsion, such as an explosive emulsion, are thereby greatly reduced and the only required materials are the hydrocarbyl-substituted anhydride, preferably polyisobutenyl succinic anhydride; a hydroxy amine, preferably diethylethanol amine; an oxidizer salt solution such as an ammonium nitrate solution; and a continuous phase oil (e.g., pale oil).

The process of the present invention comprises preparing a water-in-oil emulsion, which is comprised of a continuous oil phase and a discontinuous aqueous phase. The process comprises first preparing an oil phase containing a hydrocarbyl-substituted anhydride. An aqueous phase containing an hydroxy amine is then prepared. The two phases are then sufficiently mixed to create a water-in-oil emulsion, with the anhydride and amine reacting at the interface of the two phases. The reaction of the anhydride and amine at the interface creates an emulsifier product which stabilizes the water-in-oil emulsion. In a preferred embodiment, the hydrocarbyl-substituted anhydride is a polyisobutenyl succinic anhydride, and the hydroxy amine is diethylethanol amine. The method is particularly useful for preparing an explosive emulsion, wherein the aqueous phase comprises an oxidizer salt, preferably ammonium nitrate.

The resulting water-in-oil emulsion prepared comprises a continuous oil phase containing a hydrocarbyl-substituted anhydride, a discontinuous aqueous phase containing a hydroxy amine, preferably an N-(hydroxyl substituted hydrocarbyl)amine, whereby the anhydride and amine form a reaction product at the interface of the continuous and discontinuous phases. This reaction product is an emulsifier product which stabilizes the water-in-oil emulsion. The anhydride is preferably polyisobutenyl succinic anhydride, and the amine is preferably diethylethanol amine. It is also preferred to prepare explosive emulsions, whereby an oxidizer salt such as ammonium nitrate is contained in the discontinuous aqueous phase.

DETAILED DESCRIPTION OF THE PREFERRED EMBODIMENTS

The water-in-oil emulsion of the present invention comprises a continuous oil phase containing a hydrocarbyl-substituted anhydride, as well as a discontinuous aqueous phase containing an hydroxy amine, e.g., an N-(hydroxyl substituted hydrocarbyl)amine. Mixing of the two phases creates a stable water-in-oil emulsion as the anhydride and amine form a reaction product at the interface of the continuous and discontinuous phases.

The hydrocarbyl-substituted anhydrides, e.g., PIBSA, can be prepared by any of several known procedures which are described in the following U.S., British and Canadian patents: U.S. Pat. Nos. 3,024,237; 3,087,936; 3,172,982; 3,215,707; 3,219,666; 3,231,587; 3,245,910; 3,254,025; 3,271,310; 3,272,743; 3,272,746; 3,278,550; 3,288,714; 3,307,928; 3,312,619; 3,341,542; 3,367,943; 3,373,111; 3,374,174; 3,381,022; 3,394,179; 3,454,607; 3,346,354; 3,470,098; 3,630,902; 3,652,616; 3,755,169; 3,868,330; 3,912,764; and 4,368,113. British Patent Nos. 944,136; 1,085,903; 1,162,436; and 1,440,219, and Canadian Patent No. 956,397. These patents are incorporated herein by reference.

The olefinic monomers used in the preparation of the hydrocarbyl-substituted anhydride are generally of a length of from $C_4$ through $C_{18}$, and may be used singly or in combination. However, the average chain length of the olefinic or vinyl addition polymer (excluding branching or side chains) should be within the range of 10 to 32 carbon atoms. The olefinic or vinyl addition polymers, e.g., polyisobutene, are conveniently bis-carboxylated or converted to an acid anhydride derivative by reaction with such materials as succinic or maleic anhydride, succinic maleic acid, tetrahydrophthalic anhydride, mesaconic acid, glutaconic acid, sorbic acid, itaconic acid, itaconic anhydride and the like. For purposes of the present invention, it is preferred that polyisobutene be reacted with succinic anhydride to form polyisobutenyl succinic anhydride (PIBSA), as is known in the art.

The amines used in the present invention for reaction with the PIBSA or other hydrocarbyl-substituted anhydride are hydroxyamines. These hydroxyamines can be primary, secondary, or tertiary amines. Typically, the hydroxyamines are primary, secondary or tertiary alkanol amines or mixtures thereof. Such amines can be represented, respectfully, by the formulae:

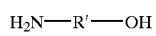

-continued

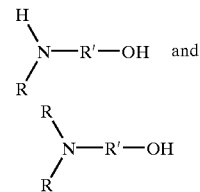

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group -R'-OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to seven carbon atoms.

Examples of the N-(hydroxyl-substituted hydrocarbyl) amines include mono-, di-, and triethanol amine, diethylethanol amine, di-(3-hydroxyl propyl)amine, N-(3-hydroxyl butyl)amine, N-(4-hydroxyl butyl)amine, N,N-di-(2-hydroxyl propyl)amine, N-(2-hydroxyl ethyl)morpholine and its thio analog, N-(2-hydroxyl ethyl)cyclohexyl amine, N-3-hydroxyl cyclopentyl amine, o-, m- and n-aminophenol, N-(hydroxyl ethyl)piperazine, N,N'-di(hydroxyl ethyl) piperazine, and the like. Diethylethanol amine is most preferred for purposes of the present invention.

In another embodiment, the hydroxyamines can also be an ether N-(hydroxy-substituted hydrocarbyl)amine. These are hydroxyl-substituted poly(hydrocarbyloxy)analogs of the above-described hydroxy amines (these analogs also include hydroxyl-substituted oxyalkylene analogs). Such N-(hydroxyl-substituted hydrocarbyl)amines can be conveniently prepared by reaction of epoxides with afore-described amines and can be represented by the formulae:

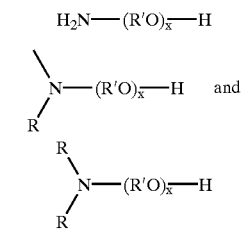

wherein x is a number from about 2 to about 15 and R and R' are as described above.

Polyamine analogs of these hydroxy amines, particularly alkoxylated alkylene polyamines (e.g., N,N-(diethanol)-ethylene diamine) can also be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary, secondary or tertiary alkanol amines with ethylene, propylene or higher epoxides in a 1:1 to 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3hydroxybutyl)tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

The oxygen-supplying component of the discontinuous phase when an explosive emulsion is to be prepared suitably comprises any oxidizer salt capable of releasing oxygen in an explosive environment in an amount and at a rate sufficient to confer acceptable explosive characteristics on the emulsion composition. Inorganic oxidizer salts conventionally employed in the production of emulsion explosive compositions, and suitable for inclusion in the compositions of the present invention, are disclosed, for example, in U.S. Pat. No. 3,447,978 and include ammonium salts and salts of the alkali- and alkaline-earth metals—such as the nitrate, chlorate and perchlorate salts, and mixtures thereof. Other suitable salts include hydrazine nitrate and urea perchlorate. The oxygen-supplying component may also comprise an acid, such as nitric acid.

Ammonium nitrate is preferably employed as the oxidizer salt for purposes of the present invention. From about 10% to about 65% of the total oxidizer salt may be added in particle or prill form. For example, AN prills or ANFO can be combined with and mixed into the emulsion. The present invention exhibits good emulsion stability in the presence of such prills.

The organic medium capable of forming the continuous phase of an emulsion explosive composition in accordance with the present invention serves as a fuel for the explosive composition and should be substantially insoluble in the component(s) of the discontinuous phase, with which it should be capable of forming an emulsion in the presence of an effective amount of the emulsifying agent of the present invention. Ease of emulsification depends, inter alia, on the viscosity of the organic medium and although the resultant emulsion may have a substantially solid continuous phase, the organic medium should be capable of existing initially in a sufficiently fluid state, if necessary, in response to appropriate temperature adjustment, to permit emulsification to proceed.

Suitable organic media which are capable of existing in the liquid state at convenient emulsion formulation temperatures include saturated and unsaturated aliphatic and aromatic hydrocarbons, and mixtures thereof. Preferred media include refined (white) mineral oil, diesel oil, paraffin oil, petroleum distillates, benzene, toluene, dinitrotoluene, styrene, xylenes, and mixtures thereof. Pale oil is preferred for the present invention.

In addition to the organic fuel medium, the continuous phase may optionally comprise a wax to control the rheology of the system, although the presence of a wax is not necessary to achieve the desired conductivity levels. Suitable waxes include petroleum, mineral, animal, and insect waxes. The preferred waxes have melting temperatures of at least 30° C. and are readily compatible with the formed emulsion. A preferred wax has a melting temperature in a range of from about 40° C. to 75° C.

Generally, the continuous phase (including wax(es), if present) comprises from 1 to 10, and preferably from 2 to 8% by weight of the total explosive composition, but higher proportions, for example in a range of from 1 up to 15 or even 20% may be tolerated.

When the inventive emulsions are employed as explosive emulsions, such emulsions typically contain other additional additives such as sensitizing components. The sensitizing components are distributed substantially homogeneously throughout the emulsions. These sensitizing components are preferably occluded gas bubbles which may be introduced in the form of glass or resin microspheres or other gas-containing particulate materials. Alternatively, gas bubbles may be generated in-situ by adding to the composition and distributing therein a gas-generating material such as, for example, an aqueous solution of sodium nitrite. Other suitable sensitizing components which may be employed alone or in addition to the occluded or in-situ generated gas bubbles include insoluble particulate solid self-explosives such as, for example, grained or flaked TNT, DNT, RDX and the like and water-soluble and/or hydrocarbon-soluble organic sensitizers such as, for example, amine nitrates, alkanolamine nitrates, hydroxyalkyl nitrates, and the like. The explosive emulsions of the present invention may be formulated for a wide range of applications. Any combination of sensitizing components may be selected in order to provide an explosive composition of virtually any desired density, weight-strength or critical diameter.

The quantity of solid self-explosive ingredients and of water-soluble and/or hydrocarbon-soluble organic sensitizers may comprise up to about 40% by weight of the total emulsion. The volume of the occluded gas component may comprise up to about 50% of the volume of the total explosive emulsion.

Optional additional materials may be incorporated in the explosive emulsions of the invention in order to further improve sensitivity, density, strength, rheology and cost of the final explosive. Typical of materials found useful as optional additives include, for example, emulsion promotion agents such as highly chlorinated paraffinic hydrocarbons, particulate oxygen-supplying salts such as prilled ammonium nitrate, calcium nitrate, perchlorates, and the like, particulate metal fuels such as aluminum, silicon and the like, particulate non-metal fuels such as sulfur, gilsonite and the like, particulate inert materials such as sodium chloride, barium sulphate and the like, water phase or hydrocarbon phase thickeners such as guar gum, polyacrylamide, carboxymethyl or ethyl cellulose, biopolymers, starches, elastomeric materials, and the like, crosslinkers for the thickeners such as potassium pyroantimonate and the like, buffers or pH controllers such as sodium borate, zinc nitrate and the like, crystals habit modifiers such as alkyl naphthalene sodium sulphonate and the like, liquid phase extenders such as formamide, ethylene glycol and the like and bulking agents and additives of common use in the explosives art.

The quantities of optional additional materials used may comprise up to about 50% by weight of the total explosive composition, the actual quantities employed depending upon their nature and function.

In the method of the present invention, the PIBSA-based emulsifier is created in essence "in-situ", during the emulsification process, thereby eliminating the amination step of the reaction. In order to perform this in-situ emulsification, only a slight modification to the conventional process to make an emulsion is needed. The fuel blend is comprised of only the hydrocarbyl-substituted anhydride, e.g., polyisobutenyl succinic anhydride, and the oil phase, comprised of, for example, pale oil, and the weight percentages are adjusted for the absence of the reacted amine. The raw amine (e.g., diethylethanol amine) is then added directly to the aqueous solution, e.g., containing ammonium nitrate. After this point, the emulsification process is conventional, with the two phases being mixed sufficiently to create a water-in-oil emulsion.

In theory, it is believed that after the ingredients are emulsified and micelles form, the polyisobutenyl succinic anhydride molecules are correctly oriented at the interface so that the carboxyl groups are in contact with the aqueous phase. The carboxyl groups are then able to react with the free amine present in the aqueous ammonium nitrate solution. The formation of the emulsifier occurs in-situ at the interface. The formation is schematically illustrated below:

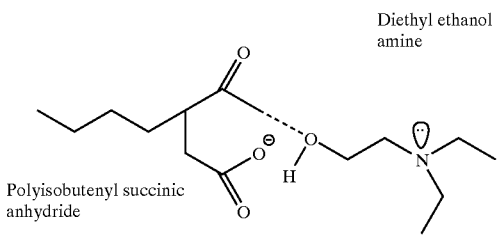

The resulting emulsions made by the in-situ process of the present invention exhibit slightly lower viscosities as compared to those made using a premade emulsifier such as a PIBSA/amine emulsifier. The main advantages of the present invention, however, are in the process. The present method is more economical as it avoids the PIBSA/amine reaction step. Furthermore, it has been found that the presence of the amine in the aqueous phase is advantageous as well. The amine actually decreases the interfacial tension of the ammonium nitrate phase, thereby making it easier to form a water-in-oil emulsion.

The present invention will be further illustrated by the following examples, which are in no manner meant to be limiting, but only illustrative.

EXAMPLE 1

In order to demonstrate that the reaction of the amines with polyisobutenyl succinic anhydride was actually taking place insitu, a few experiments were run.

First, it was shown that the amine and polyisobutenyl succinic anhydride will react almost instantaneously at room temperature when added together in some form of solvent. The solvent used was pale oil and a fuel blend consisting of only polyisobutenyl succinic anhydride and pale oil was made. After the polyisobutenyl succinic anhydride was completely dissolved in the oil, the desired amount of amine (diethylethanol amine) was added. It was observed that the two components did react very quickly to give an emulsifier. The IR spectra of the emulsifier was made in confirmation.

Second, three emulsions using tap water as the aqueous phase in order to avoid any ill effects of the ammonium nitrate in an IR analysis were made. The first emulsion was prepared in accordance with the present invention. The second emulsion was made by using premade PBISA/amine. The third emulsion used only PIBSA as the emulsifier. IR spectra were taken of all three emulsions. Each emulsion has the same inherent peaks at 1535, 1459 and 1375 wavenumbers (cm-1). The first two; in-situ emulsifier and conventional emulsifier, have the same ratios between the peaks. Only the third spectra, the polyisobutenyl succinic anhydride emulsion, has a different peak ratio.

EXAMPLE 2

Seven test emulsions were made using at least one example of primary, secondary and tertiary alkanol amines with various molar ratios in respect to each polyisobutenyl succinic anhydride molecule in accordance with the present invention. All emulsions were observed to remain stable, and passed all testing. The testing used includes:

1) cup density
2) viscosity
3) particle size
4) paint shaker test
5) observation of sensitized and blended material Samples sensitized with EM1 microspheres pass if they do not crystallize after introduction of the glass. Samples made into 50/50 blends with ANFO pass if they remain moist and stable for 14 days. The data is shown below in Table I.

TABLE I

| | Before Paint Shaker | | | After Paint Shaker* | | | Samples Made and Status | |
|---|---|---|---|---|---|---|---|---|
| Emulsifier and Ratio | Density | Viscosity | Part. Sz. | Density | Viscosity | Part. Sz. | 1% EM1 bubbles** | 50/50 Blend*** |
| Tertiary Alkanol Amines | | | | | | | | |
| Diethylethanolamine (DEEA) @ 1:1 | 1.36 | 32000 | 13.13 | 1.359 | 42000 | 12.3 | passed | passed |
| Diethylethanolamine (DEEA) @ 1:6.1 | 1.362 | 25000 | 12.7 | 1.359 | 34000 | 10.71 | passed | passed |
| Triethanolamine @ 2:1 | 1.368 | 24000 | 12.37 | 1.361 | 29000 | 11.61 | passed | passed |
| Secondary Alkanol Amines | | | | | | | | |
| Diethanolamine @ 2:1 | 1.366 | 18000 | 13.21 | 1.362 | 32000 | 10.19 | passed | passed |
| Primary Alkanol Amines | | | | | | | | |
| Ethanolamine @ 2:1 | 1.359 | 16000 | 13.25 | 1.354 | 38000 | 9.68 | passed | passed |
| Ethanolamine @ 3:1 | 1.361 | 12000 | 17.55 | 1.361 | 28000 | 12.04 | passed | passed |
| Primary Amines | | | | | | | | |
| Butylamine @ 2:1 | 1.363 | 23000 | 10.31 | 1.359 | 26000 | 10.22 | passed | passed |

*All paint shaker tests were 4 hours in length.
**50/50 blends pass if still moist after 2 weeks.
***Sensitized material passes if it remains unbroken after addition of microspheres.

While the present invention has been described in relation to its preferred embodiments, it is to be understood that various modifications thereof will become apparent to those skilled in the art upon reading the specification. Therefore, it is to be understood that the invention disclosed herein is intended to cover such modifications as fall within the scope of the claims appended hereto.

What is claimed is:

1. A method for preparing a water-in-oil emulsion comprising a continuous oil phase and a discontinuous aqueous phase which comprises:

preparing an oil phase containing a hydrocarbyl-substituted anhydride;

preparing an aqueous phase containing an hydroxy amine; and mixing the two phases sufficiently to create a water-in-oil emulsion with the anhydride and amine reacting at the interface of the two phases to form an emulsifier product.

2. The method of claim 1, wherein the anhydride is polyisobutylene succinic anhydride.

3. The method of claim 1, wherein the amine is diethylethanol amine.

4. The method of claim 2, wherein the amine is diethylethanol amine.

5. The method of claim 4, wherein the aqueous phase further comprises an oxidizer salt.

6. The method of claim 5, wherein the oxidizer salt comprises ammonium nitrate.

7. The method of claim 5, wherein a sensitizing component is mixed into the emulsion.

8. The method of claim 7, wherein the sensitizing component comprises microspheres.

* * * * *